2,786,845

ISOMERIC MIXTURES OF 6-METHYL-5-CHLORO- AND 7-CHLORO - 1,2,3,4 - TETRAHYDROQUINO- LINE DERIVATIVES

Hans Mauss, deceased, late of Wuppertal-Barmen, Germany, by Elfriede Mauss, executrix, Wuppertal-Barmen, and Heinrich Kölling and Rudolf Gönnert, Wuppertal-Elberfeld, Germany, assignors to Schenley Industries, Inc., New York, N. Y., a corporation of Delaware No Drawing. Application May 17, 1954,
Serial No. 430,402

Claims priority, application Germany May 23, 1953

6 Claims. (Cl. 260—288)

This invention relates in general to new chemical compounds. More particularly, the invention contemplates the provision of new chemotherapeutic agents which are effective in the treatment of schistosomiasis (bilharziasis) caused by the trematode parasites or blood flukes *Schistosoma masoni* and *Schistosoma haematobium*.

Various preparations are presently in use by the profession in the treatment of Schistosoma infections, such for example, as the compound 1-diethylaminoethylamino - 4- methylthioxanthone hydrochloride (Miracil D—trade name). In copending United States applications Serial Nos. 317,826 and 331,108, now abandoned, filed on October 30, 1952, and January 13, 1953, respectively, there are disclosed other groups of compounds which have been found to be efficacious against these forms of infection, which comprise, 2-halo-4-amino-toluenes; and 2-nitro or 2-cyano-4-amino-toluenes, respectively, substituted in the aromatic amino group by aminoalkyl residues.

In accordance with this invention, we have found that a new group of compounds, also of excellent efficacy against Schistosoma infections, is comprised of 6-methyl-(5- or 7-)halo-1,2,3,4-tetrahydroquinoline compounds, which are substituted by aminoalkyl residues at the nitrogen atom.

In principle, the halogen substituents at the 5 position or 7 position in the compounds of the present invention may be iodine, bromine, chlorine or fluorine, but we have found that the chloro-substituted tetrahydroquinoline compounds of the class described are particularly efficacious for the purpose intended. Furthermore, we have found that the presence of a methyl group in the 6 position of the tetrahydroquinolines as well as a halogen atom in the 5 or 7 position of the molecule, are critical for purposes of securing the stated chemotherapeutic utility.

The carbon chain of the aminoalkyl substituents at the nitrogen atom may be straight, branched or substituted, and the terminal amino radical of the aminoalkyl group may be primary, secondary or tertiary. In the latter instance, it may also be a member of a saturated heterocyclic ring, such, for example, as a pyrrolidine, piperidine, cyclohexylamine, piperazine or morpholine ring. Aminoalkyl residues having carbon chains of 2 to 3 carbon atoms and a tertiary amino group have been found to be particularly suitable.

In addition to the aforementioned aminoalkyl substituents, the 6-positioned methyl group, and the 5- or 7-positioned halogen substituents in the compounds of the invention, the tetrahydroquinoline molecule may bear one or more other substituents in the 2, 3, or 4 positions, such, for example, as lower alkyl groups.

The novel compounds of the invention may be represented by the following general formula:

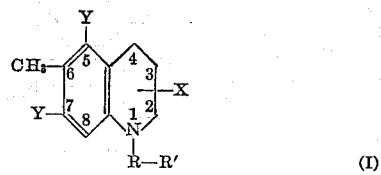

wherein X is a member or mixed members of the group consisting of hydrogen and lower alkyl radicals; Y is hydrogen in one position and a halogen atom in the other position; R is an alkyl group comprising not more than 4 carbon atoms; and R' is a member including a nitrogen atom, through which it is linked to the remainder of the molecule, chosen from the group consisting of,

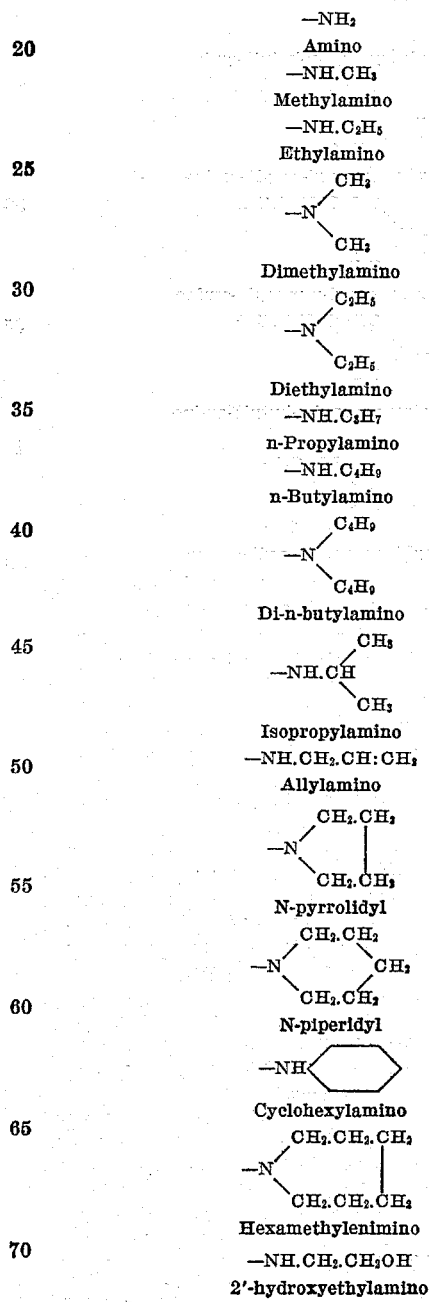

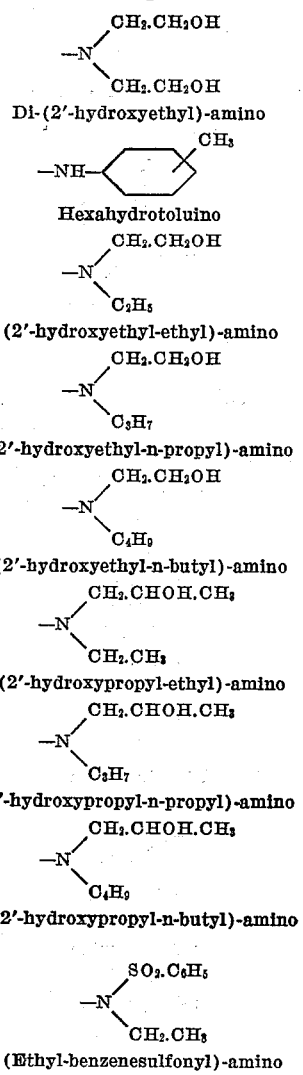

Di-(2'-hydroxyethyl)-amino

Hexahydrotoluino (2'-hydroxyethyl-ethyl)-amino (2'-hydroxyethyl-n-propyl)-amino (2'-hydroxyethyl-n-butyl)-amino (2'-hydroxypropyl-ethyl)-amino 2'-hydroxypropyl-n-propyl)-amino (2'-hydroxypropyl-n-butyl)-amino and (Ethyl-benzenesulfonyl)-amino It has been found that isomeric mixtures of the 6-methyl-5-halo- and 7-halo-1,2,3,4-tetrahydroquinoline compounds of the invention possess the desirable chemotherapeutic properties hereinbefore described, and, for this reason, it is advantageous in the preparation of most of the compounds, particularly for large-scale operations, to proceed directly from the isomeric mixtures obtained by subjecting a 2-halo-4-amino-toluene to the conventional quinoline syntheses. The compounds obtained in this manner are isomeric mixtures of 5-halo and 7-halo, aminoalkyl-substituted tetrahydroquinolines and may be used in that form, or preferably, in the form of hydrochloride salts of the mixture of bases. The bases readily form hydrochlorides which are generally well crystallized compounds. The compounds of the invention are characteristically nearly colorless to yellowish-colored oils which are soluble in inorganic and organic acids.

The new compounds can be prepared by reacting, according to conventional procedures, 6-methyl-5- or 7-halo-1,2,3,4-tetrahydroquinoline or substitution products thereof with reactive esters of amino alcohols, i. e., the hydrogen halide esters or esters with aliphatic or aromatic sulfonic acids, preferably in the presence of condensing agents, or with the amino alcohols themselves, using in this case condensing agents such as phosphorus pentoxide, vitreous phosphoric acid, boron-phosphoric acids, hydrates of boron phosphate, boron phosphate (BPO₄), zinc chloride and aluminum chloride. The condensation of the amino alcohol with the organic amine may also be effected using basic condensing agents. Such agents are the basic compounds of the alkali and alkaline earth metals and of magnesium and aluminum. When basic condensing agents are employed preferably at least one of the reacting components is used in the form of compound with one of the said metals. In such cases the amino compound is advantageously used in the form of an acyl derivative.

Alternatively, the aminoalkyl radical may be synthesized by stages by subsequently converting 6-methyl-5- or 7-halo-1,2,3,4-tetrahydroquinolines or substitution products thereof, which bear an alkyl or acyl group substituted by a reactive radical at the nitrogen atom of the quinoline ring, into the aminoalkyl substituted derivatives.

A further embodiment of the invention comprises converting 6-methyl-5- or 7-halo-1,2,3,4-tetrahydroquinolines or their substitution products into acylamino-alkyl substituted compounds, and reducing the acyl radicals to alkyl groups or by removing them, if desired after alkylation. This procedure is at times advantageous to insure uniform monoaminoalkylation.

It is possible to convert 6-methyl-5- or 7-halo-1,2,3,4-tetrahydroquinolines or their substitution products into N-aminoacyl compounds and to reduce the resulting N-aminoacyl-6-methyl-5- or 7-halo-1,2,3,4-tetrahydroquinolines to the corresponding aminoalkyl compounds.

In order to facilitate a better understanding of the subject matter of this invention, specific examples illustrating methods for preparing typical compounds of the invention are set forth hereinafter:

Example 1

Synthesis of the compound represented by the formula:

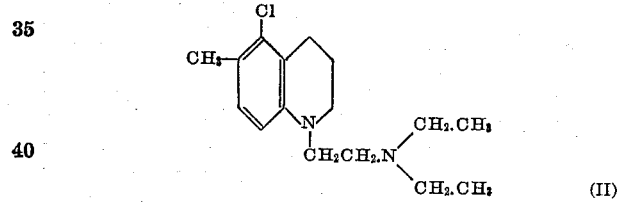

6 - methyl - 5 - chloro - 1,2,3,4 - tetrahydroquinoline, in amount 90.8 grams (0.5 mol.), and 67.8 grams (0.5 mol.) of β-diethylaminoethyl chloride are heated in the oil bath to 100° C. with stirring for one hour. The melt is dissolved in water and non-reacted starting material is removed by extracting the aqueous solution with ether. The melt is then rendered alkaline. 6 - methyl - 5 - chloro-N - β - diethylaminoethyl - 1,2,3,4 - tetrahydroquinoline separates. It distills at a temperature between 182°–183° C. under a pressure of 4 mm. Hg as a colorless oil. It yields a colorless hydrochloride upon addition of a solution of hydrogen chloride in alcohol. The hydrochloride melts at 191–192° C. upon recrystallization from alcohol.

6-methyl-5-chloroquinoline is employed as an intermediate product in the preparation of the starting material of this example and it is obtained by converting 6-methyl-5-aminoquinoline which is known from the literature, into 6-methyl-5-chloroquinoline (according to Sandmeyer), which boils at 109–110° C. at a pressure of 2.5 mm. Hg; melts at 45–46° C.; and yields a colorless hydrochloride of melting point 225–226° C. (with decomposition), and a yellow colored picrate of melting point 206–207° C. The starting material, 6-methyl-5-chloro-1,2,3,4-tetrahydroquinoline, is obtained from the intermediate, 6-methyl-5-chloroquinoline, by catalytic hydrogenation with Raney nickel in a methanol solution (70–80° C.; 50 atmospheres pressure). This product boils at 155°–158° C. at a pressure of 11 mm. Hg and yields a colorless hydrochloride, of melting point 216–217° C., with alcohol containing hydrochloric acid upon addition of some ether; and a picrate, which may be recrystallized from alcohol, upon addition of ethereal picric acid (melting point, 145–145.5° C.)

Example 2

Synthesis of the compound represented by the formula:

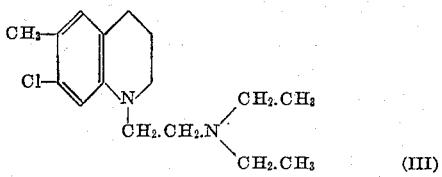

(III)

6 - methyl - 7 - chloro - 1,2,3,4 - tetrahydroquinoline, in amount 90.8 grams (0.5 mol.), and 67.8 grams (0.5 mol.) of β-diethylaminoethyl chloride, are heated in the oil bath to 100° C. with stirring for one hour. By extracting the melt taken up in water with ether to remove non-reacted starting material and rendering alkaline, 6-methyl-7-chloro - N - β - diethylaminoethyl - 1,2,3,4 - tetrahydroquinoline is recovered as a colorless oil of boiling point 169°–171° C. at a pressure of 3.5 mm. Hg. The base yields a colorless hydrochloride of melting point 190–191° C.

The starting material, 6-methyl-7-chloro,-1,2,3,4-tetrahydroquinoline is prepared from 6-methyl-7-chloroquinoline, which is obtained from the known compound, 2-chloro-4-aminotoluene, according to Skraup's synthesis. The isomeric mixture of 6-methyl-5-chloroquinoline and 6 - methyl - 7 - chloroquinoline, a slightly yellow colored oil of boiling point 121–125° C. at a pressure of 4 mm. Hg, is obtained first; solidifying in the receiver to a limited extent at the beginning of distillation and completely towards the end of the distillation. Because of their different solubilities in alcohol, the picrates of this oil can be separated readily. The pure, 6-methyl-7-chloroquinoline, (boiling point 120–122° C. at a pressure of 3.5 mm. Hg; melting point 75–76° C.; melting point of the colorless hydrochloride 202–203° C.) is obtained by splitting the substantially alcohol-insoluble picrate of 6-methyl-7-chloroquinoline (melting point above 260° C.) with an alkali-metal hydroxide solution. The compound is subjected to catalytic reduction. The resultant 6 - methyl - 7 - chloro - 1,2,3,4 - tetrahydroquinoline boils at 128–129° C. at a pressure of 3 mm. Hg and melts at 77–77.5° C. after solidifying. It yields a colorless hydrochloride of melting point 226–227° C. which can be recrystallized from alcohol.

Example 3

Synthesis of the compounds represented by the following formulae:

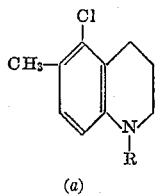 and 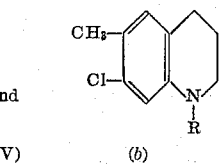

(a) (IV) (b)

(A) Preparation of the compounds represented by the above formulae (IV), wherein R is:

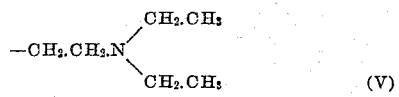

(V)

An isomeric mixture, in amount 90.8 grams (0.5 mol.), of 6 - methyl - 5 - chloro - 1,2,3,4 - tetrahydroquinoline and 6 - methyl - 7 - chloro - 1,2,3,4 - tetrahydroquinoline of boiling point 125–129° C. at a pressure of 2.5 mm. Hg, which is obtained by catalytic hydrogenation of the isomeric mixture of 6-methyl-5-chloro-quinoline and 6-methyl-7-chloro-quinoline, is heated in the oil bath with 67.8 grams (0.5 mol.) of β-diethylaminoethyl chloride to 100° C. with stirring for one hour. After taking up the melt in water, non-reacted starting material is removed by shaking with ether, the aqueous solution is rendered alkaline and the precipitated isomeric mixture of 6-methyl - 5 - chloro - N - β - diethylaminoethyl - 1,2,3,4-tetrahydroquinoline and 6 - methyl - 7 - chloro - N - β-diethylaminoethyl - 1,2,3,4 - tetrahydroquinoline is obtained in a pure state by distillation. The mixture of bases distills between 171–174° C. at a pressure of 2.5 mm. Hg as a yellowish oil and yields a colorless hydrochloride of melting point 161–162° C. by addition of a stoichiometric proportion of hydrogen chloride in alcohol and accelerating the crystallization by the addition of ether. The hydrochloride base is recrystallized from alcohol (50 grams of substance dissolved in 50 cc. of dry ethanol) with the addition of some ether. It has a melting point of 166–167° C.

In an analogous manner, the following compounds can be obtained from the isomeric mixture of 6-methyl-5-chloro - 1,2,3,4 - tetrahydroquinoline and 6 - methyl-7-chloro-1,2,3,4-tetrahydroquinoline by employing the respective starting compounds indicated:

(B) Preparation of the compounds represented by Formulae IV, wherein R is:

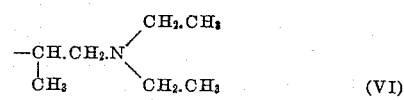

(VI)

By employing β-diethylaminoisopropyl chloride, the isomeric mixture, 6-methyl-5-chloro-N-β-diethylaminoisopropyl - 1,2,3,4 - tetrahydroquinoline and 6 - methyl-7-chloro - N - β - diethylaminoisopropyl - 1,2,3,4 - tetrahydroquinoline, is obtained as a yellowish oil of boiling point 170–172° C. at a pressure of 2.5 mm. Hg; the hydrochloride melts at 168° C. after sintering from 160° C.

(C) Preparation of the compounds represented by Formulae IV, wherein R is:

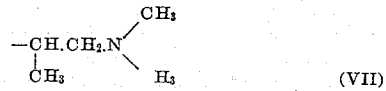

(VII)

By employing β-dimethylaminoisopropyl chloride, the isomeric mixture, 6 - methyl - 5 - chloro - N - β - dimethylaminoisopropyl - 1,2,3,4 - tetrahydroquinoline and 6 - methyl - 7 - chloro - N - β - dimethylaminoisopropyl-1,2,3,4-tetrahydroquinoline, is obtained as a yellowish oil of boiling point 167–169° C. at a pressure of 2.5 mm. Hg; 1 gram of the mixture of bases takes 3.75 cc. of n/1 hydrochloric acid for the formation of the hydrochloride.

(D) Preparation of the compounds represented by Formulae IV, where R is:

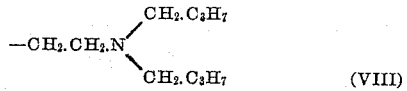

(VIII)

By employing β-di-n-butylaminoethyl chloride, the isomeric mixture 6 - methyl - 5 - chloro - N - β - di - n - butylaminoethyl-1,2,3,4-tetrahydroquinoline and 6-methyl-7 - chloro - N - β -di - n - butylaminoethyl - 1,2,3,4 - tetrahydroquinoline, is obtained as an almost colorless oil of boiling point 200–202° C. at a pressure of 2.5 mm. Hg; 1 gram of the mixture of bases takes 2.97 cc. of n/1 hydrochloric acid upon titration.

(E) Preparation of the compounds represented by Formulae IV, wherein R is:

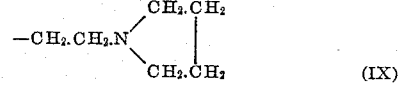

(IX)

By employing N-β-chloroethyl-pyrrolidine, the isomeric mixture, 6-methyl-5-chloro-N-β-pyrrolidyl - ethyl-1,2,3,4-tetrahydroquinoline and 6-methyl-7-chloro-N - β-pyrrolidyl-ethyl-1,2,3,4-tetrahydroquinoline, is obtained as a slightly yellowish-colored oil of boiling point 196–197° C. at a pressure of 3.5 mm. Hg; the hydrochloride of the mixed bases has a melting point of 165–166° C.

(F) Preparation of the compounds represented by Formulae IV, wherein R is:

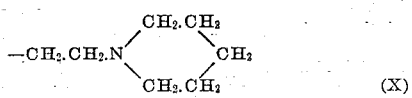

By employing N-β-chloroethyl-piperidine, the isomeric mixture, 6-methyl-5-chloro-N - β - piperidyl-ethyl-1,2,3,4-tetrahydroquinoline and 6-methyl-7-chloro-N-β-piperidyl-ethyl-1,2,3,4-tetrahydroquinoline, is obtained as a colorless oil of boiling point 204–205° C. at a pressure of 3.5 mm. Hg; the hydrochloride of the mixed bases has a melting point of 249–250° C.

(G) Preparation of the compounds represented by Formulae IV, wherein R is:

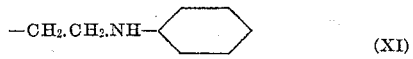

By employing N - β - chloroethylcyclohexylamine, the isomeric mixture, 6-methyl-5 - chloro - N - β - cyclohexylaminoethyl-1,2,3,4-tetrahydroquinoline and 6-methyl-7-chloro - N - β-cyclohexylamino-ethyl-1,2,3,4 - tetrahydroquinoline, is obtained as an almost colorless oil which boils at 177–181° C. in the mercury vacuum pump. The ethereal solution of the oil yields a colorless hydrochloride of melting point 202° C. after sintering from 197° C. upon titration with a solution of hydrogen chloride in alcohol.

(H) Preparation of the compounds represented by Formulae IV, wherein R is:

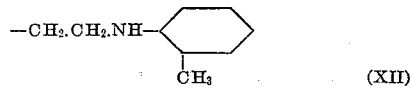

By employing N - β-chloroethylhexahydro-o-toluidine, the isomeric mixture, 6-methyl-5-chloro-N-β-hexahydro-o-toluinoethyl-1,2,3,4-tetrahydroquinoline and 6-methyl-7-chloro-N-β-hexahydro-o-toluinoethyl - 1,2,3,4 - tetrahydroquinoline, is obtained as a colorless oil which distills at 185° C. in the mercury vacuum pump. The ethereal solution of the oil yields a colorless hydrochloride of melting point 175° C. after sintering from 170° C. upon titration with a solution of hydrogen chloride in alcohol.

*Example 4*

Synthesis of the compounds represented by the following formulae:

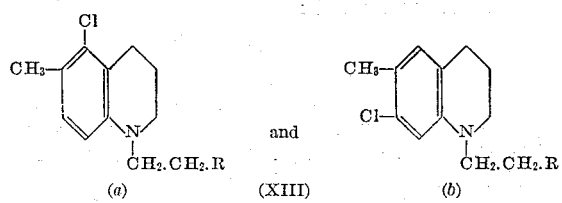

(A) Preparation of the compounds represented by the above Formulae (XIII), wherein R is:

—NH.CH₃          (XIV)

The isomeric mixture of 6-methyl-5-chloro-1,2,3,4-tetrahydroquinoline and 6-methyl-7-chloro-1,2,3,4-tetrahydroquinoline described in Example 3, is stirred with ethylene chlorohydrin and phosphorus pentachloride in dry chloroform at 110° C. to yield an isomeric mixture of 6-methyl-5-chloro-N-β-hydroxyethyl-1,2,3,4 - tetrahydroquinoline and 6-methyl-7-chloro-N-β-hydroxy-ethyl-1,2,3,4-tetrahydroquinoline of boiling point 173–176° C., at a pressure of 2 mm. Hg. This isomeric mixture is then chlorinated to yield an isomeric mixture of 6-methyl-5-chloro-N-β-chloroethyl-1,2,3,4-tetrahydroquinoline and 6-methyl-7-chloro-N-β - chloroethyl-1,2,3,4 - tetrahydroquinoline as a reddish-colored oil. The oil may be distilled or used in the following reactions without purification.

The isomeric reaction mixture of 6-methyl-5-chloro-N-β-chloroethyl-1,2,3,4 - tetrahydroquinoline and 6-methyl-7-chloro-N-β-chloroethyl-1,2,3,4 - tetrahydroquinoline, in amount 81.4 grams (⅓ mol.) is heated in the autoclave to 170° C. for 5 hours with an excess of methylamine in benzene. Upon cooling, the solvent is evaporated, the residue mixed with water, rendered alkaline and extracted with ether to yield the isomeric mixture of 6-methyl-5-chloro-N-β-methyl-aminoethyl-1,2,3,4 - tetrahydroquinoline and 6-methyl-7-chloro-N - β - methylamino-ethyl-1,2,3,4-tetrahydroquinoline as a slightly yellow-colored oil of boiling point 163–164° C. at a pressure of 3 mm. Hg. Upon titrating the ethereal solution of this mixture of bases with a solution of hydrogen chloride in alcohol a colorless hydrochloride is obtained, which melts at 176° C. after sintering.

In an analogous manner, the following compounds can be obtained from the isomeric mixture of 6-methyl-5-chloro - N - β - chloroethyl - 1,2,3,4 - tetrahydroquinoline and 6 - methyl - 7 - chloro - N - β - chloroethyl - 1,2,3,4-tetrahydroquinoline by employing the respective starting compounds indicated:

(B) Preparation of the compounds represented by Formulae XIII, wherein R is:

—NH.C₂H₅          (XV)

By employing an excess of ethylamine in benzene the isomeric mixture, 6-methyl-5-chloro-N-β-ethylaminoethyl-1,2,3,4-tetrahydroquinoline and 6-methyl-7-chloro-N-ethylaminoethyl-1,2,3,4-tetrahydroquinoline, is obtained as a slightly yellow-colored oil of boiling point 170–172° C. at a pressure of 3 mm. Hg. The ethereal solution of this oil yields a colorless hydrochloride of melting point 180–181° C. upon addition of a solution of hydrogen chloride in alcohol.

(C) Preparation of the compounds represented by Formulae XIII, wherein R is:

—NH.C₃H₇          (XVI)

By employing an excess of n-propylamine in benzene the isomeric mixture, 6-methyl-5-chloro-N-β-n-propylaminoethyl - 1,2,3,4 - tetrahydroquinoline and 6 - methyl-7 - chloro - N - β - n - propylaminoethyl - 1,2,3,4 - tetrahydroquinoline, is obtained as a yellowish oil of boiling point 170–172° C. at a pressure of 2.5 mm. Hg, which, upon addition of a solution of hydrogen chloride in alcohol to its ethereal solution, yields a colorless hydrochloride of melting point 175° C. after sintering from 169° C.

(D) Preparation of the compounds represented by Formulae XIII, wherein R is:

—NH.C₄H₉          (XVII)

By employing an excess of n-butylamine in benzene, the isomeric mixture, 6-methyl-5-chloro-N-β-n-butylaminoethyl-1,2,3,4-tetrahydroquinoline and 6-methyl-7-chloro - N - β - n - butylaminoethyl - 1,2,3,4 - tetrahydroquinoline, is obtained as a yellowish oil of boiling point 178–179° C. at a pressure of 2.5 mm. Hg, which, upon the addition of a stoichiometric proportion of hydrogen chloride in alcohol to the ethereal solution of the base, yields a colorless hydrochloride of melting point 187–188° C., after sintering from 150° C.

(E) Preparation of the compounds represented by Formulae XIII, wherein R is:

—NH.CH₂.CH₂OH          (XVIII)

By employing an excess of ethanolamine in benzene, the isomeric mixture, 6 - methyl - 5 - chloro - N - β - (2' - hydroxyethylamino) - ethyl - 1,2,3,4 - tetrahydroquinoline and 6 - methyl - 7 - chloro - N - β - (2' - hydroxy - ethyl - amino) - ethyl - 1,2,3,4 - tetrahydroquinoline, is obtained as a slightly yellowish colored oil of boiling point 199–201° C. at a pressure of 0.6 mm. Hg, which solidifies to yield colorless crystals of the M. P. 98–99° C. upon stirring with a little ether. This compound of mixed bases yields a colorless hydrochloride of the M. P. 120° C., after sintering from 115° C., upon the addition of a stoichiometric proportion of hydrogen chloride in alcohol.

(F) Preparation of the compounds represented by Formulae XIII, wherein R is:

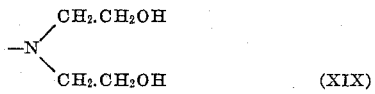

By employing an excess of diethanolamine in benzene, the isomeric mixture 6 - methyl - 5 - chloro - N - β - [di-(2' - hydroxyethyl) - amino] - ethyl - 1,2,3,4 - tetrahy-

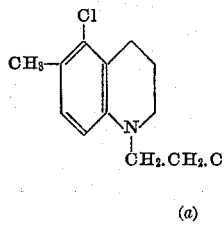

droquinoline and 6-methyl-7-chloro-N-β-[di-2'-hydroxyethyl) - amino] - ethyl - 1,2,3,4 - tetrahydroquinolines, is obtained as a slightly yellow-colored oil of boiling point 244–246° C., at a pressure of 0.7 mm. Hg. Upon the addition of the alcoholic solution of this oil of a solution of hydrogen chloride in alcohol and a little ether, a colorless hydrochloride of melting point 128° C. precipitates.

(G) Preparation of the compounds represented by the Formulae XIII, wherein R is:

By employing an excess of allylamine in benzene, the isomeric mixture, 6 - methyl - 5 - chloro - N - β - allylaminoethyl - 1,2,3,4 - tetrahydroquinoline and 6 - methyl-7 - chloro - N - β - allylaminoethyl - 1,2,3,4 - tetrahydroquinoline, is obtained, having a boiling point of 178–179° C. at a pressure of 2.5 mm. Hg. Upon adding a stoichiometric proportion of hydrogen chloride in alcohol and ether to the alcoholic solution, a hydrochloride of melting point 149° C. precipitates in the form of colorless crystals.

*Example 5*

Synthesis of the compounds represented by the following formulae:

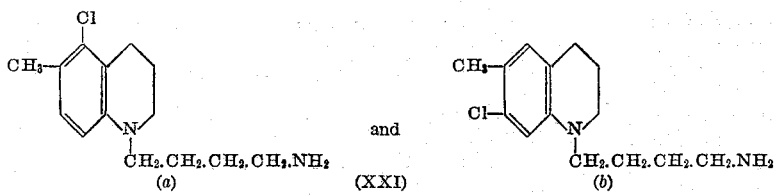

The isomeric mixture of 6-methyl-5-chloro-1,2,3,4-tetrahydroquinoline and 6-methyl-7-chloro-1,2,3,4-tetrahydroquinoline, in amount 121 grams (⅔ mol.), is heated with 94 grams (⅓ mol.) of bromobutylphthalimide in the oil bath to 150–160° C. with stirring for one hour. An isomeric mixture of 6-methyl-5-chloro-N-δ-phthalimido-n-butyl-1,2,3,4-tetrahydroquinoline and 6-methyl-7-chloro - N - δ - phthalimido - n - butyl - 1,2,3,4 - tetrahydroquinoline, separates upon the addition of water and soon solidifies in crystalline form. It is washed with a little ether and recrystallized from alcohol. The yellow-colored crystals thus obtained provide a clear melt at 105° C., with sintering from 92° C. The phthalic acid radical is split off by boiling 91 grams of the isomeric mixture in 300 cc. of dry ethanol with 16 grams of hydrazine hydrate with stirring for one hour. After adding 75 cc. of concentrated hydrochloric acid and 75 cc. of water, the alcohol is distilled off and the filtered, clear solution rendered alkaline after concentrating on the water bath. The isolated reaction product consists of the isomeric mixture of 6-methyl-5-chloro-N-δ-amino-n-butyl-1,2,3,4-tetrahydroquinoline and 6-methyl-7-chloro-N-δ-amino-n-butyl-1,2,3,4-tetrahydroquinoline; a slightly yellow-colored oil distilling between 179–181° C. at a pressure of 2.5 mm. Hg. One gram of the mixture of bases dissolves in 3.957 cc. of n/1 hydrochloric acid.

*Example 6*

Synthesis of the compounds represented by the following formulae:

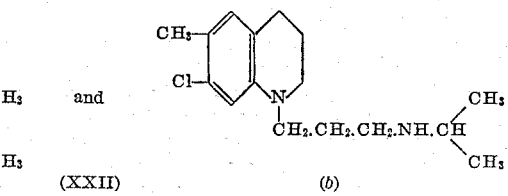

By adding acrylonitrile in acetic acid solution to the isomeric mixture of 6-methyl-5-chloro-1,2,3,4-tetrahydroquinoline and 6-methyl-7-chloro-1,2,3,4-tetrahydroquinoline, the isomeric mixture, 6-methyl-5-chloro-N-β-cyanoethyl-1,2,3,4-tetrahydroquinoline and 6-methyl-7-chloro-N-β-cyanoethyl-1,2,3,4-tetrahydroquinoline, is obtained as a yellowish oil of boiling point 184–185° C. at a pressure of 2 mm. Hg. By catalytic reduction of this isomeric mixture with Raney cobalt in methanol at 80° C. and a pressure of 50 atmospheres, the isomeric mixture, 6-methyl-5-chloro-N-γ-aminopropyl - 1,2,3,4 - tetrahydroquinoline and 6 - methyl-7-chloro-N-γ-aminopropyl-1,2,3,4-tetrahydroquinoline, is obtained as a colorless oil of boiling point 174–175° C. at a pressure of 1.5 mm. Hg.

The latter reaction mixture, in amount 79.6 grams (⅓ mol.) in benzene, is heated in an autoclave with 41 grams of isopropyl bromide and 23 grams of anhydrous potassium carbonate for five hours. Upon cooling and evaporating the solvent, the residue is taken up in water, rendered alkaline, and extracted with ether to yield the isomeric mixture of 6-methyl-5-chloro-N-γ-isopropylamino-propyl-1,2,3,4-tetrahydroquinoline and 6-methyl-7-chloro-N-γ-isopropylaminopropyl - 1,2,3,4 - tetrahydroquinoline, by distillation. The product is a colorless oil of boiling point 181–184° C., at a pressure of 2.5 mm. Hg. Upon the addition of a stoichiometric proportion of a solution of hydrogen chloride in alcohol to the mixture of bases in ethereal solution and titration of the same, a colorless hydrochloride of melting point 168°–169° C. is obtained.

*Example 7*

Synthesis of the compound represented by the following formula:

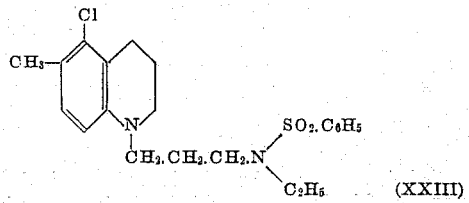

By reacting benzenesulfonyl chloride with 6-methyl-5-chloro-N-γ-aminopropyl-1,2,3,4 - tetrahydroquinoline in benzene in the presence of pyridine, there is obtained, 6-methyl-5-chloro-N-γ - [(benzenesulfonyl) - amino]-propyl-1,2,3,4-tetrahydroquinoline in the form of colorless crystals of melting point 143° C., upon recrystallization from alcohol. This compound, in amount 126.1 grams (⅓ mol.), is reacted in a solution of sodium ethylate (7.6 grams Na, and 600 cc. C₂H₆O) with 60 grams of ethyl iodide and boiled with stirring for two hours. After evaporating the alcohol, the residue is taken up in methylene chloride, and non-reacted starting material is removed by shaking the methylene chloride solution with dilute sodium chloride solution to yield, 6-methyl-5-chloro-N-γ-[(ethyl-benzenesulfonyl)-amino]-propyl-1,2,3,4-tetrahydroquinoline, by recrystallization from alcohol after evaporating the original solvent. The product is precipitated in the form of colorless crystals of melting point 114–115° C.

The starting material, 6-methyl-5-chloro-N-γ-aminopropyl-1,2,3,4-tetrahydroquinoline, (boiling point 159–160° C., 0.25 mm. Hg; hydrochloride melting point 182–183° C.) is obtained by catalytic reduction of 6-methyl-5-chloro-N-β-cyanoethyl - 1,2,3,4 - tetrahydroquinoline, c. f. Example 6. The latter product is obtained as a slightly yellow oil of boiling point 172° C. at a pressure of 0.12 mm. Hg (colorless crystals of melting point 54–55.5° C. after recrystallizing from ligroin) by adding acrylonitrile to 6-methyl-5-chloro-1,2,3,4-tetrahydroquinoline in acetic acid solution.

*Example 8*

Synthesis of the compound represented by the following formula:

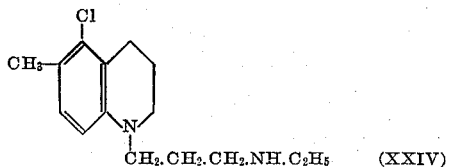

(A) 6-methyl-5-chloro-N-γ-[(ethyl-benzenesulfonyl)-amino]-propyl-1,2,3,4-tetrahydroquinoline of Example 7, in amount 135.4 grams (⅓ mol.), is heated in a mixture of 110 cc. of concentrated sulfuric acid and 45 cc. of glacial acetic acid on the steam bath for two hours and in the oil bath for another half hour to 120° C. The solution is cooled by pouring onto ice and is then rendered alkaline. 6 - methyl - 5 - chloro - N - γ - ethylaminopropyl-1,2,3,4-tetrahydroquinoline precipitates and is extracted with ether, extracted from the resulting ethereal solution with dilute glacial acetic acid, rendered alkaline and extracted with ether again and finally distilled. The product is obtained as a slightly yellow-colored oil of boiling point 186° C. at a pressure of 3.5 mm. Hg. The alcoholic solution of the base yields a colorless hydrochloride of melting point 167–168° C. upon the addition of a stoichiometric proportion of hydrogen chloride in alcohol and a little ether.

(B) Alternatively, 6-methyl-5-chloro-N-γ-acetaminopropyl-1,2,3,4-tetrahydroquinoline, a viscous oil of boiling point 232–235° C. at 0.3 mm. Hg, is produced from the 6 - methyl - 5 - chloro - N - γ - aminopropyl - 1,2,3,4-tetrahydroquinoline of Example 7, by reaction with acetic acid or acetyl chloride in benzene in the presence of pyridine. This compound, in amount 33 grams, is added in drops to a boiling ethereal solution of 250 grams of lithium aluminum hydride (3.7% by weight) and the ethereal solution is kept boiling until reduction is complete. Excess lithium aluminum hydride is then decomposed with water. 6 - methyl - 5 - chloro - N - γ - ethylaminopropyl-1,2,3,4-tetrahydroquinoline is obtained as a colorless oil of boiling point 176° C. at a pressure of 2.75 mm. Hg. The base yields a colorless hydrochloride of melting point 167–168° C. upon the addition of a stoichiometric proportion of hydrogen chloride in alcohol and ether.

*Example 9*

Synthesis of the compound represented by the following formula:

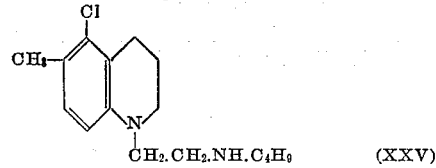

6 - methyl - 5 - chloro - N - butylaminoaceto - 1,2,3,4-tetrahydroquinoline (colorless crystals of melting point 68–69° C. after recrystallizing from ligroin) is produced from the reaction product of 6-methyl-5-chloro-1,2,3,4-tetrahydroquinoline with chloroacetylchloride in ether, (6 - methyl - 5 - chloro - N - chloroaceto - 1,2,3,4 - tetrahydroquinoline, colorless crystals of melting point 92–93° C. upon recrystallizing from alcohol), by heating under pressure with butylamine in benzene in an autoclave at 170° C. for 4 hours.

The 6 - methyl - 5 - chloro - N - butylaminoaceto-1,2,3,4-tetrahydroquinoline, in amount 29.4 grams, is reacted in 400 cc. of dry ether with 250 grams of an ethereal lithium aluminum hydride solution, (3.7% by weight) to yield 6-methyl-5-chloro-N-β-butylaminoethyl-1,2,3,4-tetrahydroquinoline as a colorless oil of boiling point 186–187° C. at a pressure of 2.5 mm. Hg. The compound yields a colorless hydrochloride of a melting point 213° C. upon adding a solution of hydrogen chloride in alcohol to the base solution.

*Example 10*

Synthesis of the compounds represented by the following formulae:

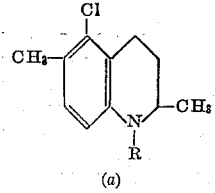 and 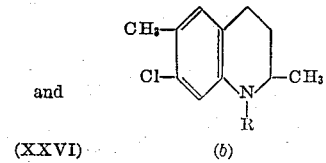

(A) Preparation of the compounds represented by Formulae XXVI, wherein R is:

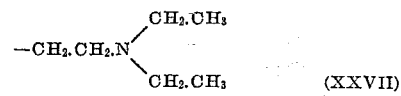

By catalytic reduction of an isomeric mixture of 2,6-dimethyl-5-chloro-quinoline and 2,6-dimethyl-7-chloro-quinoline, obtained in known manner (see German Patent No. 567,273) from 2-chloro-4-aminotoluene and crotonaldehyde by Skraup's synthesis (a colorless oil of boiling point 120–122° C. at a pressure of 2 mm. Hg; the hydrochloride—from alcohol and ether—melting at 225–248° C. and the picrate at 200–206° C.), we obtain the isomeric mixture of 2,6-dimethyl-5-chloro-1,2,3,4-tetrahydroquinoline and 2,6-dimethyl-7-chloro-1,2,3,4-tetrahydroquinoline. The mixture of bases has a boiling point of 121–123° C. at a pressure of 2 mm. Hg. A hydrochloride of melting point 175–177° C. is obtained. The melting point of the hydrochloride increases to 192–197° C., probably with concentration of one of the two isomers, upon recrystallization from alcohol.

The isomeric mixture, in amount 97.8 grams (0.5 mol.), is heated to 120° C. for one hour with 67.8 grams (0.5 mol.) of β-diethylaminoethyl chloride. Upon cooling, the melt is taken up in water, non-reacted starting material is removed by shaking with ether and the aqueous solution is rendered alkaline to yield an isomeric mixture of 2,6 - dimethyl - 5 - chloro - N - β - diethylaminoethyl - 1,2,3,4 - tetrahydroquinoline and 2,6 - dimethyl - 7-chloro - N - β - diethylaminoethyl - 1,2,3,4 - tetrahydroquinoline, as a yellowish oil of boiling point 175–178° C. The hydrochloride of the mixture of bases is readily water soluble and melts at 137–138° C.

In an analogous manner, the following compounds may be obtained from the isomeric reaction mixture of 2,6-dimethyl-5-chloro-1,2,3,4-tetrahydroquinoline and 2,6-dimethyl-7-chloro-1,2,3,4-tetrahydroquinoline, by employing the starting materials indicated.

(B) Preparation of the compound represented by Formulae XXVI, wherein R is:

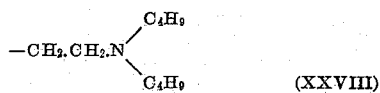
(XXVIII)

By employing β-di-n-butylaminoethyl chloride at an external temperature of 100° C., an isomeric reaction mixture of 2,6-dimethyl-5-chloro-N-β-di-n-butylaminoethyl-1,2,3,4-tetrahydroquinoline and 2,6-dimethyl-7-chloro - N - β - di - n - butylaminoethyl - 1,2,3,4 - tetrahydroquinoline, is obtained as a yellowish-colored oil of boiling point 203–206° C., at a pressure of 3 mm. Hg. One gram of the mixture of bases dissolves in 2.85 cc. of n/1 hydrochloric acid.

(C) Preparation of the compound represented by Formulae XXVI, wherein R is:

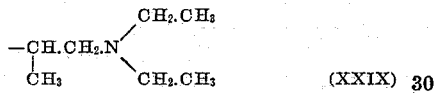
(XXIX)

By employing β-diethylaminoisopropyl chloride at an external temperature of 130° C., an isomeric reaction mixture of 2,6-dimethyl-5-chloro-N-β-diethylaminoisopropyl-1,2,3,4-tetrahydroquinoline and 2,6-dimethyl-7-chloro - N - β - diethylaminoisopropyl - 1,2,3,4 - tetrahydroquinoline, is obtained as a slightly yellow-colored oil of boiling point 170–171° C., at a pressure of 2 mm. Hg. One gram of the mixture dissolves in 3.22 cc. of n/1 hydrochloric acid.

(D) Preparation of the compound represented by Formulae XXVI, wherein R is:

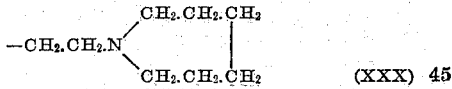
(XXX)

By employing N-β-chloroethylhexamethylenimine at an external temperature of 100° C., the isomeric reaction mixture, 2,6 - dimethyl - 5 - chloro - N - β - hexamethyleniminoethyl - 1,2,3,4 - tetrahydroquinoline and 2,6 - dimethyl - 7 - chloro - N - β - hexamethyleniminoethyl-1,2,3,4-tetrahydroquinoline, is obtained as a colorless oil of boiling point 200–202° C., at a pressure of 2 mm. Hg. Upon adding hydrogen chloride in alcohol to the ethereal solution of the mixture, a colorless hydrochloride separates having a melting point of 195–196° C., with sintering from 190° C.

(E) Preparation of the compound represented by Formulae XXVI, wherein R is:

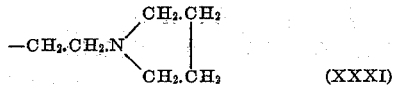
(XXXI)

By employing N-β-chloroethylpyrrolidine, the isomeric reaction mixture, 2,6-dimethyl-5-chloro-N-β-pyrrolidylethyl-1,2,3,4-tetrahydroquinoline and 2,6-dimethyl-7-chloro - N - β - pyrrolidyl - ethyl - 1,2,3,4 - tetrahydroquinoline, is obtained as a slightly yellow-colored oil of boiling point 188–192° C. at a pressure of 2 mm. Hg. Upon adding a solution of hydrogen chloride to the mixture of bases in ethereal solution, a colorless hydrochloride is obtained having a melting point of 166° C., with sintering from 160° C. The hydrochloride yields a citrate of melting point 131–132° C. (with decomposition) and a maleate of melting point 143–144° C., by pouring its concentrated solution in ethanol into a heated solution of citric acid or maleic acid.

*Example 11*

Synthesis of the compounds represented by the following formulae:

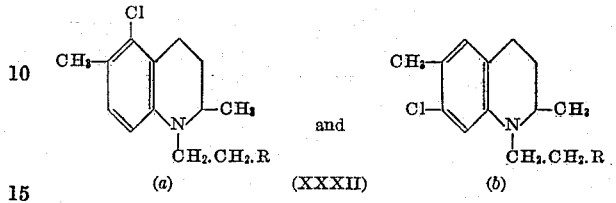
(a) (XXXII) (b)

(A) Preparation of the compounds represented by Formulae XXXII, wherein R is:

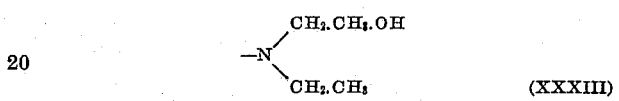
(XXXIII)

By the same procedure employed in the production of the isomeric mixture of 6-methyl-5-chloro-N-β-chloroethyl-1,2,3,4-tetrahydroquinoline and 6-methyl-7-chloro-N - β - chloroethyl - 1,2,3,4 - tetrahydroquinoline in Example 4, the isomeric mixture of 2,6-dimethyl-5-chloro-N-β-chloroethyl-1,2,3,4-tetrahydroquinoline and 2,6-dimethyl - 7 - chloro - N - β - chloroethyl - 1,2,3,4 - tetrahydroquinoline, is obtained by chlorinating an isomeric mixture of 2,6-dimethyl-5-chloro-N-β-hydroxyethyl-1,2,3,4-tetrahydroquinoline and 2,6-dimethyl-7-chloro-N-β-hydroxyethyl-1,2,3,4-tetrahydroquinoline with phosphorus pentachloride in dry chloroform. The latter intermediate mixture is obtained as a colorless oil of boiling point 186° C., at a pressure of 3 mm. Hg, by heating β-chloroethanol at 140° C. with the isomeric mixture of 2,6 - dimethyl - 5 - chloro - 1,2,3,4 - tetrahydroquinoline and 2,6 - dimethyl - 7 - chloro - 1,2,3,4 - tetrahydroquinoline. The reaction mixture, 2,6-dimethyl-5-chloro-N - β - chloroethyl - 1,2,3,4 - tetrahydroquinoline and 2,6 - dimethyl - 7 - chloro - N - β - chloroethyl - 1,2,3,4-tetrahydroquinoline, has a boiling point of 146–149° C., at a pressure of 0.15 mm. Hg.

The above reaction mixture, in amount 86 grams (⅓ mol.) is stirred with excess hydroxyethylethylamine in the oil bath at an external temperature of 170° C. for two hours. Upon cooling, the melt is mixed with water and the aqueous solution rendered alkaline to yield the isomeric mixture of 2,6-dimethyl-5-chloro-N-β-[(2'-hydroxyethyl-ethyl)-amino] - ethyl-1,2,3,4-tetrahydroquinoline and 2,6-dimethyl-7-chloro-N-β-[(2'-hydroxyethylethyl)-amino] - ethyl-1,2,3,4-tetrahydroquinoline, as a colorless oil of boiling point 190–191° C., at a pressure of 0.2 mm. Hg. One gram of the mixture of bases dissolves in 3.22 cc. of n/1 hydrochloric acid.

In an analogous manner, the following products may be obtained from the isomeric mixture of 2,6-dimethyl-5-chloro-N-β-chloroethyl-1,2,3,4-tetrahydroquinoline and 2,6-dimethyl - 7 - chloro-N-β-chloroethyl - 1,2,3,4-tetrahydroquinoline, by employing the starting compounds indicated:

(B) Preparation of the compounds represented by Formulae XXXII, wherein R is:

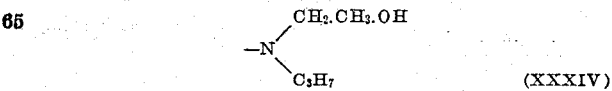
(XXXIV)

By employing an excess of hydroxyethylpropylamine at an outside temperature of 180° C., the isomeric mixture, 2,6-dimethyl-5-chloro-N - β - [(2'-hydroxyethyl-propyl)-amino] - ethyl-1,2,3,4-tetrahydroquinoline and 2,6-dimethyl-7-chloro-N-β - [(2'-hydroxyethyl-propyl)-amino]-ethyl-1,2,3,4-tetrahydroquinoline, is obtained as a colorless oil of boiling point 193°–195° C., at a pressure of 0.1 mm. Hg. One gram of the isomeric mixture dissolves in 3.08 cc. of n/1 hydrochloric acid.

(C) Preparation of the compounds represented by Formulae XXXII, wherein R is:

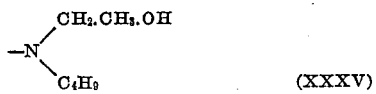
(XXXV)

By employing an excess of hydroxyethylbutylamine at an external temperature of 180° C., the isomeric mixture, 2,6-dimethyl-5-chloro-N - β - [(2'-hydroxyethyl-butyl)-amino] - ethyl-1,2,3,4-tetrahydroquinoline and 2,6-dimethyl-7-chloro-N-β - [(2'-hydroxyethyl-butyl)-amino]-ethyl-1,2,3,4-tetrahydroquinoline, is obtained as a colorless oil of boiling point 197–198° C. at a pressure of 0.2 mm. Hg. One gram of the mixture of bases dissolves in 2.95 cc. of n/1 hydrochloric acid.

(D) Preparation of the compounds represented by Formulae XXXII, wherein R is:

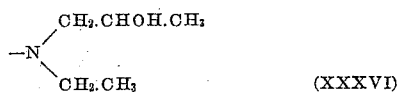
(XXXVI)

By employing an excess of 2-hydroxypropyl-ethylamine at an external temperature of 190° C., the isomeric mixture, 2,6-dimethyl-5-chloro-N - β - [(2'-hydroxypropyl-ethyl)-amino]-ethyl-1,2,3,4-tetrahydroquinoline and 2,6-dimethyl-7-chloro - N - β - [(2'-hydroxypropyl-ethyl)-amino]-ethyl-1,2,3,4-tetrahydroquinoline, is obtained as a colorless oil of boiling point 198–200° C. at a pressure of 0.35 Hg. One gram of the mixture of bases dissolves in 3.08 cc. of n/1 hydrochloric acid.

(E) Preparation of the compounds represented by Formulae XXXII, wherein R is:

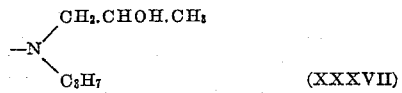
(XXXVII)

By employing an excess of 2-hydroxy-propyl-propyl-amine, the isomeric mixture, 2,6-dimethyl-5-chloro-N-β-[(2'-hydroxypropyl-ethyl)-amino] - ethyl - 1,2,3,4-tetrahydroquinoline and 2,6-dimethyl-7-chloro-N-β-[(2'-hydroxy-propyl-ethyl)-amino] - ethyl-1,2,3,4 - tetrahydroquinoline, is obtained as a colorless oil of boiling point 190° C. at a pressure of 0.2 mm. Hg. One gram of the mixture of bases dissolves in 2.95 cc. of n/1 hydrochloric acid.

(F) Preparation of the compounds represented by Formulae XXXII, wherein R is:

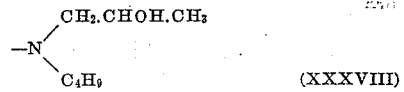
(XXXVIII)

By employing an excess of 2-hydroxy-propylbutylamine at an external temperature of 180° C., the isomeric mixture, 2,6-dimethyl-5-chloro - N - β - [(2'-hydroxypropyl-butyl)-amino] - ethyl-aminoethyl-1,2,3,4-tetrahydroquinoline and 2,6-dimethyl-7-chloro-N-β-[(2'-hydroxypropyl-butyl)-amino]-ethyl-1,2,3,4-tetrahydroquinoline, is obtained as a water-clear oil of boiling point 191–193° C., at a pressure of 0.1 mm. Hg. One gram of the mixture of bases dissolves in 2.83 cc. of n/1 hydrochloric acid.

*Example 12*

Synthesis of the compounds represented by the following formulae:

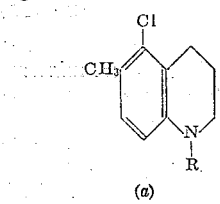 and 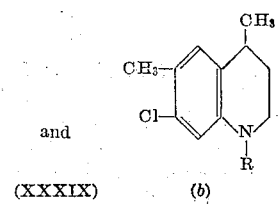
(a)    (XXXIX)    (b)

(A) Preparation of the compounds represented by Formulae XXXIX, wherein R is:

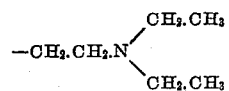

An isomeric mixture of 4,6-dimethyl-5-chloro-quinoline and 4,6-dimethyl-7-chloro-quinoline, is prepared by conventional methods (see Journal Amer. Chem. Society, 67, 86, 1945) from 2-chloro-4-aminotoluene and β-ketobutanol in the presence of zinc chloride and ferric chloride. The mixture is a colorless oil of boiling point 134–136° C., at a pressure of 3 mm. Hg, which melts at 88–93° C., with sintering from 80° C. Its melting point increases to 105–106° C. after recrystallizing from ligroin. This oil is dissolved in ten times its volume of concentrated hydrochloric acid and four times its weight of tin is added and the mixture heated for 36 hours to 130° C. The isomeric mixture of 4,6-dimethyl-5-chloro-1,2,3,4-tetrahydroquinoline and 4,6-dimethyl-7-chloro-1,2,3,4-tetrahydroquinoline is obtained as a slightly yellow colored oil of boiling point 135° C. at a pressure of 2.5 mm. Hg. The oily mixture of bases melts at 77–82° C., and, when recrystallized from ligroin, melts at 90–90.5° C., with sintering from 88° C.

To a melt of the above isomeric mixture, of amount 97.8 grams (0.5 mol.), we add by stirring 67.8 grams (0.5 mol.) of β-diethylaminoethyl chloride and heat to 110° C. for 30 minutes. After adding water and rendering alkaline, the isomeric mixture, 4,6-dimethyl-5-chloro-N-β-diethylaminoethyl - 1,2,3,4 - tetrahydroquinoline and 4,6-dimethyl-7-chloro-N-β-diethylaminoethyl-1,2,3,4-tetrahydroquinoline, is recovered from the ether extract as a slightly yellow oil of boiling point 177–178° C. at a pressure of 2 mm. Hg. A colorless hydrochloride of melting point 128–130° C. precipitates from the ethereal solution of the mixture upon addition of the proper quantity of hydrogen chloride in alcohol.

In an analogous manner, the following compounds are obtained from the isomeric mixture of 4,6-dimethyl-5-chloro-1,2,3,4-tetrahydroquinoline and 4,6-dimethyl-7-chloro-1,2,3,4-tetrahydroquinoline, by employing the starting compounds indicated:

(B) Preparation of the compounds represented by Formulae XXXIX, wherein R is:

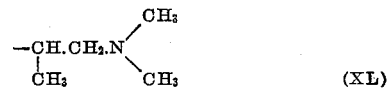
(XL)

By employing dimethylaminoisopropyl chloride at an external temperature of 110° C. initially and raising to 140° C., the isomeric reaction mixture, 4,6,-dimethyl-5-chloro-N-β-dimethylaminoisopropyl - 1,2,3,4 - tetrahydroquinoline and 4,6-dimethyl-7-chloro-N-β-dimethylaminoisopropyl-1,2,3,4-tetrahydroquinoline is obtained as a slightly yellow-colored oil of boiling point 168–170° C., at a pressure of 3 mm. Hg. One gram of the mixture dissolves in 3.51 cc. of n/1 hydrochloric acid.

(C) Preparation of the compounds represented by Formulae XXXIX, wherein R is:

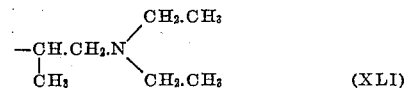
(XLI)

By employing β-diethylaminoisopropyl chloride at an external temperature of 110° C., the isomeric mixture, 4,6-dimethyl - 5-chloro-N-β-diethylaminoisopropyl-1,2,3,4-tetrahydroquinoline and 4,6-dimethyl-7-chloro-N-β-diethylaminoisopropyl-1,2,3,4-tetrahydroquinoline, is obtained as a slightly yellow-colored oil which distills at 179–180° C., at a pressure of 3 mm. Hg. A colorless hydrochloride of melting point 110–112° C. (with sintering from 105° C.) is precipitated from the ethereal solu-

Example 13

Synthesis of the compounds represented by the following formulae:

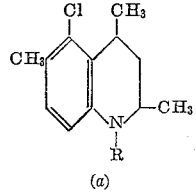 and 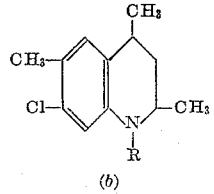

(XLII)

(A) Preparation of the compounds represented by Formulae XLII, wherein R is:

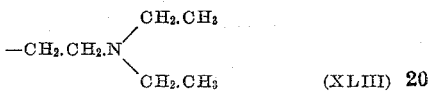

(XLIII)

An isomeric mixture of 2,4,6-trimethyl-5-chloro-quinoline and 2,4,6-trimethyl-7-chloro-quinoline is prepared in known manner (see Bull. soc. chim. (2) 49, 90, 1888) from the anil of 2-chloro-4-aminotoluene and acetylacetone, in concentrated sulfuric acid. The anil has a boiling point of 157–158° C., at a pressure of 2.5 mm. Hg (colorless crystals from ligroin of melting point 71–72° C.). The isomeric product mixture distills at 138° C. at a pressure of 2 mm. Hg and melts at 84° C. after solidifying. It is reduced to an isomeric mixture of 2,4,6-trimethyl-5-chloro-1,2,3,4-tetrahydroquinoline and 2,4,6-trimethyl-7-chloro-1,2,3,4-tetrahydroquinoline with four times its weight of tin in hydrochloric acid. The reaction product is an almost colorless oil of boiling point 147–149° C. at a pressure of 4 mm. Hg, which melts at 47–54° C. after solidifying and can be obtained in the form of colorless crystals from ligroin which have a melting point of 54–55° C., with sintering from 50° C.

The above isomeric mixture, in amount 104.8 grams (0.5 mol.), and 67.8 grams (0.5 mol.) of β-diethylaminoethyl chloride are heated to 150° C. while stirring for 1½ hours. The cooled melt is stirred with water and dilute sodium hydroxide solution, extracted with ether and the isomeric mixture, 2,4,6-trimethyl-5-chloro-N-β-diethylaminoethyl-1,2,3,4-tetrahydroquinoline and 2,4,6-trimethyl-7-chloro-N-β-diethylaminoethyl - 1,2,3,4 - tetrahydroquinoline, is isolated from the ethereal solution as a yellowish oil of boiling point 180–182° C., at a pressure of 3.5 mm. Hg. A colorless hydrochloride of melting point 125–125.5° C. precipitates from the ethereal solution of the mixture upon adding hydrogen chloride.

In an analogous manner, the following compounds may be obtained from the isomeric mixture of 2,4,6-trimethyl-5-chloro-1,2,3,4-tetrahydroquinoline and 2,4,6-trimethyl-7-chloro-1,2,3,4-tetrahydroquinoline, by employing the respective starting compounds indicated:

(B) Preparation of the compounds represented by Formulae XLII, wherein R is:

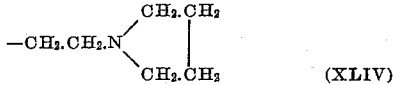

(XLIV)

By employing β-chloroethylpyrrolidine at an external temperature of 150° C. for two hours, the isomeric mixture, 2,4,6 - trimethyl - 5 - chloro - N - β - pyrrolidyl-ethyl-1,2,3,4-tetrahydroquinoline and 2,4,6-trimethyl-7-chloro-N-β-pyrrolidyl-ethyl-1,2,3,4-tetrahydroquinoline, is obtained as a slightly yellow-colored oil of boiling point 200–201° C., at a pressure of 4 mm. Hg. A hydrochloride of melting point 138–140° C. precipitates from the ethereal solution of bases upon adding a solution of hydrogen chloride in alcohol.

(C) Preparation of the compounds represented by Formulae XLII, wherein R is:

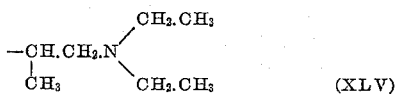

(XLV)

By employing β-diethylaminoisopropyl chloride at an external temperature initially of 110° and raised to 150° for two hours with stirring, the isomeric mixture, 2,4,6-trimethyl-5-chloro-N-β - diethylaminoisopropyl - 1,2,3,4-tetrahydroquinoline and 2,4,6-trimethyl-7-chloro-N-β-diethylaminoisopropyl-1,2,3,4-tetrahydroquinoline, is obtained as a slightly yellow-colored oil of boiling point 153–155° C. at a pressure of 0.25 mm. Hg. The mixture of bases yields a colorless hydrochloride of melting point 123–124° C., with sintering from 120° C.

Having thus described the subject matter of this invention, what it is desired to secure by Letters Patent is:

1. As a new chemotherapeutic agent, an isomeric mixture of the 5-chloro- and 7-chloro-substituted compounds represented by the following general formula:

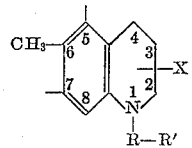

wherein X is selected from the group consisting of hydrogen and lower alkyl radicals; R is an alkyl group comprising not more than 4 carbon atoms; and R' is a substitutent including a nitrogen atom, through which it is linked to the remainder of the molecule, chosen from the group consisting of amino; methylamino; ethylamino; dimethylamino; diethylamino; n-propylamino; n-butylamino; isopropylamino; allylamino; pyrrolidyl; piperidyl; cyclohexylamino; hexamethylenimino; 2'-hydroxyethylamino; di-(2'-hydroxyethyl)-amino; hexahydrotoluino; (2'-hydroxyethyl-ethyl)-amino; (2'-hydroxyethyl-propyl)-amino; (2' - hydroxyethyl-butyl)-amino; (2' - hydroxypropyl-ethyl)-amino; (2'-hydroxypropyl-propyl)-amino; (2'-hydroxypropyl - butyl)amino; and (ethyl - benzenesulfonyl)-amino.

2. As a new chemotherapeutic agent, an isomeric mixture of 6-methyl-5-chloro-N-β-diethylaminoethyl-1,2,3,4-tetrahydroquinoline and 6-methyl-7-chloro-N-β-diethylaminoethyl-1,2,3,4-tetrahydroquinoline.

3. As a new chemotherapeutic agent, an isomeric mixture of 2,6 - dimethyl - 5 - chloro-N-β-diethylaminoethyl-1,2,3,4-tetrahydroquinoline and 2,6-dimethyl-7-chloro-N-β-diethylaminoethyl-1,2,3,4-tetrahydroquinoline.

4. As a new chemotherapeutic agent, an isomeric mixture of 2,6-dimethyl-5-chloro-N-β-diethylaminoisopropyl-1,2,3,4-tetrahydroquinoline and 2,6-dimethyl-7-chloro-N-β-diethylaminoisopropyl-1,2,3,4-tetrahydroquinoline.

5. As a new chemotherapeutic agent, an isomeric mixture of 2,6-dimethyl-5-chloro-N-β-pyrrolidyl-ethyl-1,2,3,4-tetrahydroquinoline and 2,6-dimethyl-7-chloro-N-β-pyrrolidyl-ethyl-1,2,3,4-tetrahydroquinoline.

6. As a new chemotherapeutic agent, an isomeric mixture of 2,6 - dimethyl - 5-chloro-N-β-[(2'-hydroxyethyl-ethyl)-amino]-ethyl-1,2,3,4-tetrahydroquinoline and 2,6-dimethyl-7-chloro-N-β-[(2'-hydroxyethyl-ethyl) - amino]-ethyl-1,2,3,4-tetrahydroquinoline.

References Cited in the file of this patent

Price: J. Am. Chem. Soc., vol. 68, pp. 1807–08 (1946).
Protiva et al.: Chem. Abstr., vol. 45, cols. 9522–23 (1951).